(12) United States Patent
Patel et al.

(10) Patent No.: US 7,593,331 B2
(45) Date of Patent: Sep. 22, 2009

(54) ENHANCING TRANSMISSION RELIABILITY OF MONITORED DATA

(75) Inventors: Alpesh Patel, Pleasanton, CA (US); Anantha Ramaiah, San Jose, CA (US); Syam Sundar Appala, San Jose, CA (US); Praveen Joshi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 423 days.

(21) Appl. No.: 11/655,003

(22) Filed: Jan. 17, 2007

(65) Prior Publication Data

US 2008/0170501 A1    Jul. 17, 2008

(51) Int. Cl.
  *H04L 12/26* (2006.01)
  *H04L 12/54* (2006.01)
  *G06F 15/16* (2006.01)
  *G06F 11/00* (2006.01)

(52) U.S. Cl. .................. 370/231; 370/235; 370/429; 709/235; 714/1

(58) Field of Classification Search ......... 370/229–238, 370/241–250, 418–420, 428–429; 709/223–225, 709/232–235; 714/1–57, 100
See application file for complete search history.

(56) References Cited

U.S. PATENT DOCUMENTS

| 7,007,199 B2 * | 2/2006 | Jinzaki et al. ............... 714/18 |
| 2004/0156366 A1 * | 8/2004 | Walls et al. ............... 370/394 |
| 2005/0135394 A1 * | 6/2005 | Sethi et al. ............... 370/412 |

OTHER PUBLICATIONS

Braden, R., "Time-Wait Assassination Hazards in TCP", Network Working Group, RFC 1337, May 1992, 10 pages.
Cisco, "Cisco Application-Oriented Networking Streamlines Financial Market-Data and Trade-Order Latency", Cisco Systems, Inc., Jun. 5, 2006, pp. 1-11.
Jacobson, V., et al, "TCP Extensions for High Performance", Network Working Group, RFC 1323, May 1992, 33 pages.
Stevens, W., "TCP Slow Start, Congestion Avoidance, Fast Retransmit, and Fast Recovery Algorithms", Network Working Group, RFC 2001, Jan. 1997, 6 pages.

* cited by examiner

*Primary Examiner*—Tri H Phan
(74) *Attorney, Agent, or Firm*—Hickman Palermo Truong & Becker LLP

(57) ABSTRACT

In one embodiment, an apparatus comprises logic encoded in one or more tangible media for enhancing transmission reliability of monitored data. The logic is operable to receive a plurality of segments for transmission over a TCP connection to a network node, where the TCP connection is associated with a transmit queue and a retransmit queue. The logic is also operable to detect a transmission anomaly on the TCP connection to the network node, and in response to detecting the transmission anomaly, is operable to perform any one of: store segments into a persistent buffer prior to transferring the segments into the transmit queue; copy segments from the retransmit queue into the persistent buffer, where the segments have been transmitted but not yet acknowledged by the network node; and copy segments from the transmit queue into the persistent buffer, where the segments have not yet been transmitted to the network node.

22 Claims, 5 Drawing Sheets

US 7,593,331 B2

ENHANCING TRANSMISSION RELIABILITY OF MONITORED DATA

TECHNICAL FIELD

The present disclosure relates generally to network communications.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

When transmitting data over a Transmission Control Protocol (TCP) connection, the transmit queue(s) of a sender node may overflow and the data stored therein may be lost in the event of network congestion or malfunction, receiving node overload or malfunction, or an abnormal TCP connection close. Thus, if an application needs to reliably transmit application messages to a receiving node over a TCP connection, the application needs to provide its own mechanism for reliable delivery of the messages since TCP cannot offer such guarantees in cases when TCP connections close abnormally. However, in some operational contexts it may not be possible for an application to provide such mechanism because the application messages that need to be transmitted include monitored data. As used herein, "monitored data" refers to data which cannot be re-generated by the sender or data which if re-sent by the sender would be meaningless. Examples of monitored data include, but are not limited to, time-sensitive data associated with financial or trade transactions, real-time audio or video data generated by multi-media applications, and "bursty" data that for whatever reason cannot be re-generated.

An example operational context in which monitored data needs to be reliably transmitted over TCP connections involves the monitoring of network traffic between clients and servers involved in electronic trading of financial or other market instruments. In this operational context, a network infrastructure element or a component thereof may intercept network traffic exchanged between clients and servers and may extract therefrom application-level and/or network-level data that provides an insight into the application-level and/or the network-level performance of the end nodes that generated the network traffic. The network infrastructure element or the component thereof then need to transmit all extracted data over a TCP connection to a monitoring node, so that the monitoring node may perform an accurate and detailed analysis of the network and/or the end node performance and may detect any existing problems. Thus, in this operational context the network infrastructure element or the component thereof need to ensure that all extracted data is delivered over the TCP connection to the monitoring node even in the events of a malfunction or overload at the monitoring node, an abnormal close of the TCP connection to the monitoring node, and/or congestion or malfunction of the network connecting to the monitoring node.

Although the problem of reliably transmitting monitored data is presented above with respect to TCP connections, it is noted that this problem is not unique to TCP or to any specific operational context. Rather, this problem exists for any operational context that requires reliable transmission of monitored data over any connection-oriented transport protocol such as, for example, the Stream Control Transmission Protocol (SCTP).

BRIEF DESCRIPTION OF THE DRAWINGS

Enhancing transmission reliability of monitored data is illustrated by way of example, and not by way of limitation, in the figures of the accompanying drawings and in which like reference numerals refer to similar elements and in which.

DESCRIPTION OF EXAMPLE EMBODIMENTS

Figure 1:
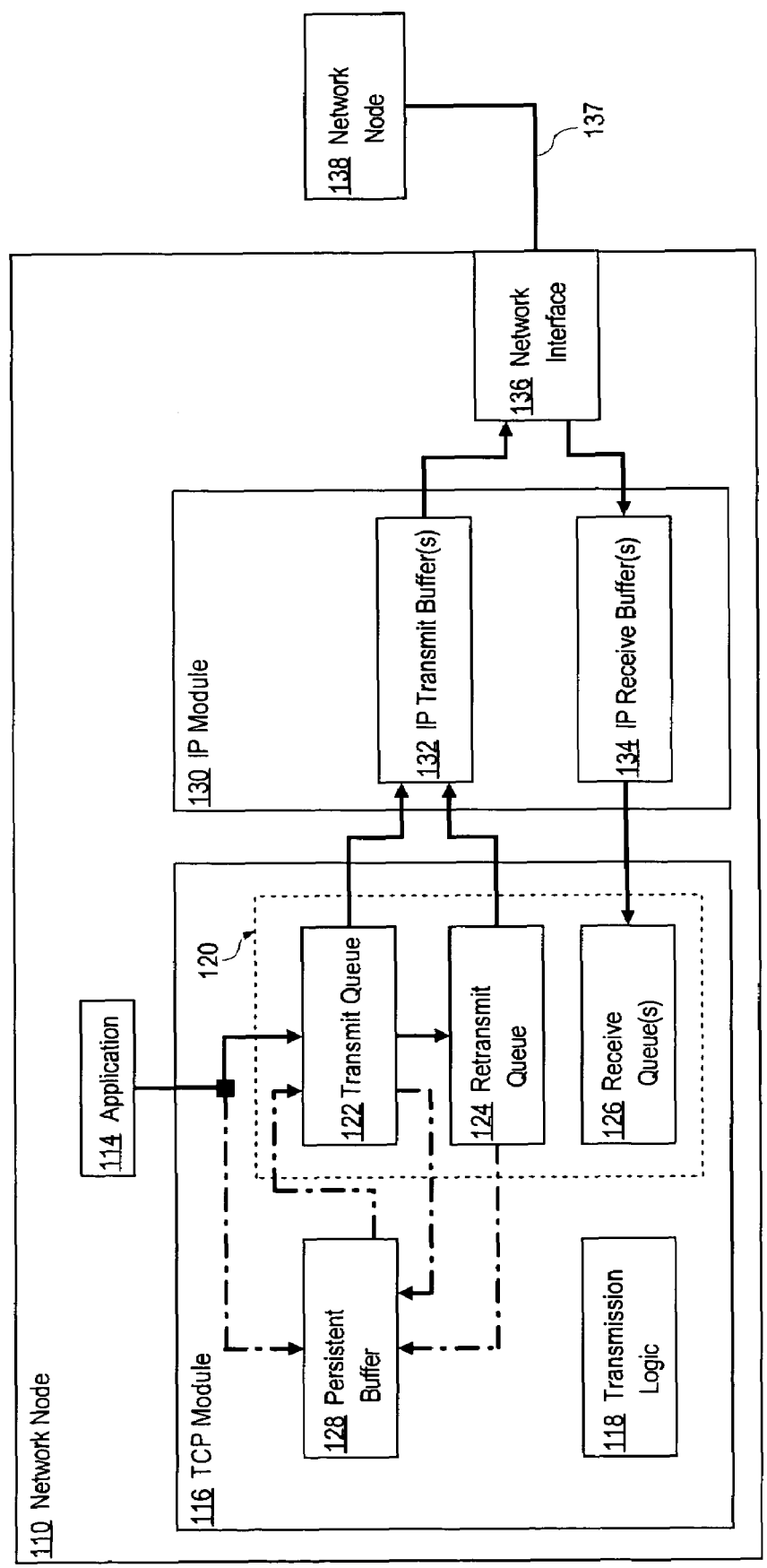
FIG. 1 illustrates an example network node operable to reliably transmit data over a TCP connection.

Enhancing transmission reliability of monitored data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Enhancing Transmission Reliability of Monitored Data
      3.1 Detecting Transmission Anomalies
      3.2 Responding to Transmission Delay Anomalies
      3.3 Responding to Loss of Connection Anomalies
      3.4 Additional Features and Alternative Embodiments
   4.0 An Example Operational Context
   5.0 Implementation Mechanisms—Hardware Overview
   6.0 Extensions and Alternatives

1.0 General Overview

Enhancing transmission reliability of monitored data is described. In an embodiment, an apparatus comprises one or more processors and logic encoded in one or more tangible media for execution. The logic when executed is operable to receive a plurality of segments for transmission over a TCP connection to a network node, where the TCP connection when established is associated with a transmit queue and a retransmit queue. When executed, the logic is operable to detect a transmission anomaly on the TCP connection to the network node, and in response to detecting the transmission anomaly, is operable to perform any one of: store first one or more segments into a persistent buffer prior to transferring the first one or more segments into the transmit queue; copy second one or more segments from the retransmit queue into the persistent buffer, where the second one or more segments have been transmitted to, but have not yet been acknowledged by, the network node; and copy third one or more segments from the transmit queue into the persistent buffer, where the third one or more segments have not yet been transmitted to the network node.

In an embodiment, a system comprises an apparatus and a monitoring node operable to process monitored data. The apparatus comprises a first network interface that is operable to communicatively connect to a packet-switched network, a second network interface that is operable to communicatively connect to the monitoring node, and logic encoded in one or more tangible media for execution. When executed, the logic is operable to: capture, at the first network interface, a packet flow that is exchanged between two nodes that are communicatively connected over the packet-switched network; copy a plurality of packets from the packet flow, where the plurality of packets represent monitored data; insert the plurality of packets into a plurality of framed messages that are formatted according to a particular protocol; generate a plurality of segments, where the plurality of framed messages are included in the payload portions of the plurality of segments, where the plurality of segments are to be sent over a TCP connection to the monitoring node, and where the TCP connection is associated with a transmit queue and a retransmit queue; detect a transmission anomaly on the TCP connection to the monitoring node; and, in response to detecting the transmission anomaly, perform any one of: store first one or more segments into a persistent buffer prior to transferring the first one or more segments into the transmit queue; copy second one or more segments from the retransmit queue into the persistent buffer, where the second one or more segments have been transmitted to, but have not yet been acknowledged by, the monitoring node; and copy third one or more segments of the plurality of segments from the transmit queue into the persistent buffer, where the third one or more segments have not yet been transmitted to the monitoring node.

Other embodiments comprise one or more computer-readable media encoded with logic for enhancing transmission reliability of monitored data as described herein.

In some embodiments, the techniques for enhancing transmission reliability described herein may be implemented using one or more computer programs executing on a network infrastructure element, such as a switch or a router, that is established in a packet-switched network. In some embodiments, the techniques described herein may be implemented by a computer system that is operatively and/or communicatively coupled to a network infrastructure element, such as a router or a switch. In some embodiments, the techniques described herein may be implemented on a host computer system that is communicatively connected to a packet-switched network. Thus, the embodiments described herein are to be regarded in an illustrative rather than a restrictive sense.

2.0 Structural and Functional Overview

FIG. 1 illustrates an example network node operable to reliably transmit monitored data. As used herein, "node" refers to any network infrastructure element, end station, host, computer system, or other apparatus comprising hardware components and software components, where the hardware components may be used to execute the software components to provide one or more functionalities. For example, in one embodiment the hardware components may comprise memory and one or more processors, and the software components may comprise an Operating System (OS) with a TCP module (stack) that is executable on the hardware components.

Among other (not shown) components, network node 110 comprises application 114, TCP module 116, Internet Protocol (IP) module 130, and network interface 136. TCP module 116 and IP module 130 may be implemented in an OS (not shown) provided on network node 110. When executed, such OS may be operable to provide, through TCP module 116 and IP module 130, TCP/IP connectivity for various servers, services, daemons, applications, and other processes that may be executing on the node. In addition, such OS may provide other services and functionalities depending on the particular operational context in which network node 110 is used.

In operation, TCP module 116 may comprise one or more components (e.g. allocated memory, data structures, etc.) that are used for establishing and maintaining one or more TCP connections to remote network nodes. For example, a TCP connection such as TCP connection 120 may comprise at least transmit queue 122, retransmit queue 124, and one or more receive queues 126. As used herein, "transmit queue" refers to a data structure that is operable to store segments that are to be transmitted on a particular TCP connection. "Retransmit queue" refers to a data structure that is operable to store segments that have already been transmitted on a particular TCP connection but have not yet being acknowledged as received by the intended receiving node. Depending on the particular TCP implementation, in various embodiments a transmit queue and a retransmit queue associated with a TCP connection may be implemented in the same shared data structures, in separate non-shared data structures, or in a combination of shared and non-shared data structures. In a typical TCP implementation, segments are first placed in the transmit queue of the corresponding TCP connection. After the segments are transmitted on the TCP connection, the segments are removed from the transmit queue and the transmitted segments or copies thereof are kept in the retransmit queue of the TCP connection until they are acknowledged by the receiving node. In a typical TCP implementation, the contents of the transmit and retransmit queues are discarded (flushed) when the TCP connection closes abnormally, for example, because of network failure, timeout, or any other unexpected event.

According to the techniques for enhancing transmission reliability described herein, in operation TCP module 116 also comprises one or more persistent buffers, such as, for example, persistent buffer 128. As used herein, "persistent buffer" refers to a data structure that is operable to store segments that need to be transmitted to, and received and acknowledged by, a particular receiving node. The persistent buffer is operable to store the segments across an abnormal TCP connection loss and/or when another transmission anomaly exists on the TCP connection. In some embodiments, segments may be stored into the persistent buffer before the segments have been placed in the transmit queue of a particular TCP connection. In some embodiments, segments may be copied from the retransmit queue of a particular TCP connection into the persistent buffer after being transmitted to, but before being acknowledged by, the receiving node. In some embodiments, segments may be copied from the transmit queue of a particular TCP connection into the persistent buffer prior to being transmitted to the receiving node. In some embodiments, segments may be stored into the persistent buffer even before a TCP connection is established to a receiving node that is the intended recipient of the segments. According to the techniques described herein, a persistent buffer may be allocated on a per-connection and a per-recipient basis, that is, a persistent buffer may be allocated for a particular TCP connection that is established or is to be established to a particular recipient that may be an application or a process executing on a receiving node. In different embodiments, a persistent buffer may be allocated on non-volatile storage medium (e.g. hard disks, optical disks, etc.), in volatile medium (e.g. RAM), or in any combination of volatile and non-volatile storage medium.

According to the techniques for enhancing transmission reliability described herein, TCP module 116 also comprises transmission logic 118. In various embodiments, transmission logic 118 may be implemented as one or more software components that are executable by one or more processors, as one or more hardware components such as Application-Specific Integrated Circuits (ASICs), or as any combination of one or more software and hardware components. According to the techniques described herein, transmission logic 118 when executed is operable to detect transmission anomalies on one or more TCP connections established and maintained by TCP module 116. As used herein, "transmission anomaly" refers to the existence of conditions that are designated as abnormal with respect to traffic that is transmitted on a transport protocol connection between two nodes. For example, transmission delays and/or abnormal loss of connection may be considered abnormal conditions on a TCP connection between two nodes. According to the techniques described herein, transmission logic 118 is operable to modify the normal TCP operation to provide reliable transmission of TCP segments on a particular TCP connection to a particular receiving node when a transmission anomaly is detected on that TCP connection.

For example, suppose that in operation network node 110 is communicatively connected over network 137 to network node 138. Network node 110 has established TCP connection 120 to network node 138, so that application 114 can transmit data to a process or an application on network node 138. Under normal TCP operation, TCP module 116 receives data messages from application 114, generates one or more TCP segments that include the message data in their payload portions, and places the segments in transmit queue 122. Thereafter, the segments in transmit queue 122 are transferred to IP module 130; concurrently therewith, the segments transferred to IP module 130 are also placed in retransmit queue 124 and are kept there until they are acknowledged by the receiving network node 138 or until a timer expires and they are discarded. When IP module 130 receives segments from transmit queue 122, IP module 130 generates one or more network packets that encapsulate the segments and places the network packets in IP transmit buffers 132. From there, the network packets are transmitted to buffers in network interface 136, which generates data frames therefrom and sends the data frames over network 137 to receiving network node 138.

Upon receiving the data frames from network interface 136, a network interface, an IP module, and a TCP module in network node 138 re-assemble the data frames into network packets and then into TCP segments. Upon receiving the segments, the TCP module in network node 138 extracts the message data from the transmitted segments and passes the data along to the recipient process or application on network node 138. The TCP module in network node 138 also sends back to network node 110 segments that acknowledge receipt of the transmitted segments. The acknowledgement segments sent from network node 138 are assembled and transferred to receive queue 126 of TCP connection 120 through network interface 136 and IP receive buffers 134 of IP module 130. TCP module 116 inspects the acknowledgement segments, determines which transmitted segments have been acknowledged, and removes the acknowledged segments from retransmit queue 124. If necessary, TCP module 126 may re-transmit any unacknowledged segments that may exist in the retransmit queue 124 within the current TCP window.

According to the techniques described herein, at some point in time transmission logic 118 may detect a transmission anomaly on TCP connection 120. For example, transmission logic 118 may determine that a transmission delay exists on TCP connection 120. In order to prevent loss of data received from application 114, transmission logic 118 stores or causes incoming segments to be stored into persistent buffer 128 instead of being placed in transmit queue 122. Incoming segments with data from application 114 are continuously stored in persistent buffer 128 at least until transmission logic 118 determines that the transmission anomaly on TCP connection 120 has cleared. When the transmission anomaly is cleared, transmission logic 118 transfers or causes the transfer of segments from persistent buffer 128 into transmit queue 122 until the persistent buffer is empty. When persistent buffer 128 empties, transmission logic 118 stops storing incoming segments therein, and TCP module 116 resumes normal operation by placing the incoming segments directly into transmit queue 122.

In another example, transmission logic 118 may determine that TCP connection 120 is lost or needs to be closed abnormally. For example, TCP module 116 may receive on TCP connection 120 from network node 138 a segment with a header in which the RST control flag is set. In response to detecting that TCP connection 120 is lost, and before the queues, buffers, and other data structures associated with TCP connection 120 are discarded, transmission logic 118 causes the copying into persistent buffer 128 of all segments that are still stored in transmit queue 122 and retransmit queue 124. The segments in transmit queue 122 are those segments that have been placed in the queue but have not yet been transmitted to network node 138; the segments in retransmit queue 124 are those segments that have been transmitted to, but have not yet been acknowledged by, network node 138. Any incoming segments with message data from application 114 are also stored in persistent buffer 128.

Thereafter, in response to the loss or abnormal close of TCP connection 120, TCP module 116 would establish a new TCP connection to network node 138. When the new TCP connection is established, transmission logic 118 transfers or causes the transfer of segments from persistent buffer 128 into the new transmit queue associated with the new TCP connection. For example, the segments that were copied into persistent buffer 128 from retransmit queue 124 would be transferred into the new transmit queue first, followed by the segments that were copied into persistent buffer 128 from transmit queue 122, and then followed by any incoming segments from application 114. When persistent buffer 128 empties, transmission logic 118 stops storing incoming segments in persistent buffer 128, and TCP module 116 resumes normal operation by placing the incoming segments directly into the new transmit queue of the new TCP connection for transmission to network node 138.

3.0 Enhancing Transmission Reliability of Monitored Data

Figure 2:
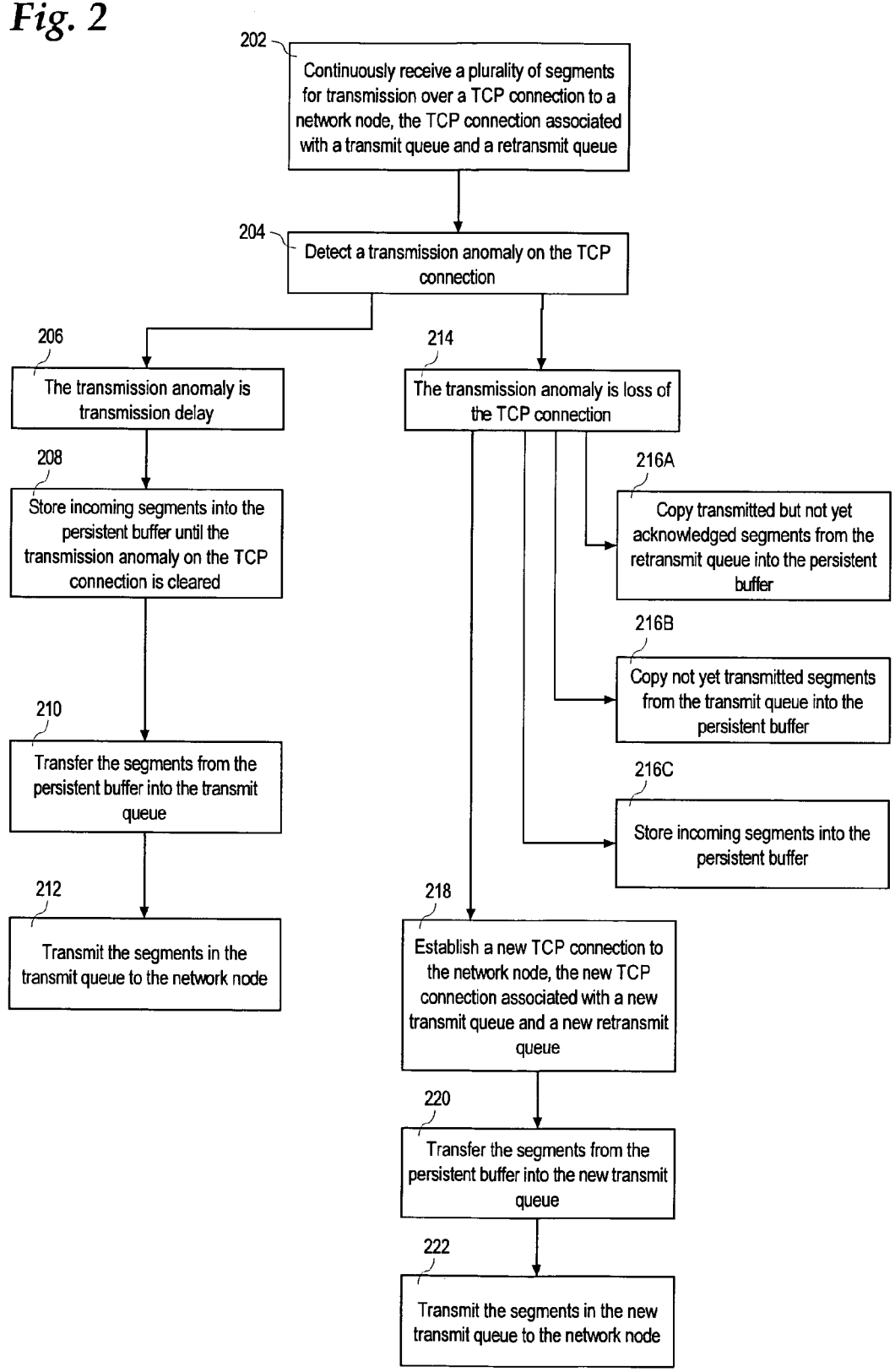
FIG. 2 illustrates an example method for enhancing transmission reliability of data over a TCP connection.

FIG. 2 illustrates an example method for enhancing transmission reliability of data over a TCP connection.

In step 202, a TCP module in a network node continuously receives a plurality of segments for transmission over a TCP connection to a receiving network node. For example, a TCP module such as TCP module 116 depicted in FIG. 1 may receive data from an upper-layer application and may generate the plurality of segments by including the received data in the payload portions of the segments.

3.1 Detecting Transmission Anomalies

Referring to FIG. 2, in step 204 the TCP module continuously monitors the TCP connection for any transmission anomalies. In some embodiments, the TCP module may include specialized hardware and/or software logic that is operable to detect various types of anomalies that may occur on the TCP connection.

One type of an anomaly that may occur on a TCP connection is transmission delay. In one embodiment, the TCP module or a component thereof may monitor one or more network metrics affecting the TCP connection to determine whether the metrics exceed certain thresholds that indicate transmission delays. In one example, the TCP module or the component thereof may monitor the round-trip latency to the receiving node and may compute the minimum, maximum, and average latency over a specified time interval. If the maximum and/or average latencies exceed certain acceptable thresholds, the TCP module or the component thereof may determine that transmission delays are occurring on the TCP connection to the receiving node. In another example, the TCP module or the component thereof may monitor one or more other metrics associated with the TCP connection such as, for example, average request-response times, number of retransmissions, and average number of unacknowledged segments transmitted over the TCP connection. If these monitored metrics exceed certain acceptable thresholds, the TCP module or component thereof may conclude that transmission delays are occurring on the TCP connection.

In another example, to determine whether a transmission delay is occurring on a TCP connection, the TCP module or the component thereof may determine whether one or more zero window size advertisements are transmitted by the receiving node. For example, the TCP module or the component thereof may monitor whether TCP segments received over the TCP connection from the receiving node include a header in which a window size field is set to zero, which would indicate that the receiving node is not capable (e.g. for lack of available buffers or for other reasons) of receiving any more segments at this point in time. In general, to determine whether a transmission delay is occurring over the TCP connection, the TCP module or the component thereof may monitor any metrics that may reflect the congestion and/or delays on the network or networks connecting to the receiving node and any metrics that may reflect malfunction or delays caused by the receiving node itself. If a monitored metric, a combination of monitored metrics, and/or any metrics derived therefrom exceed certain acceptable thresholds, the TCP module or the component thereof may determine that a transmission delay is occurring on the TCP connection to the receiving node.

Another type of an anomaly that may be detected according to the techniques described herein is abnormal close or loss of the TCP connection to the receiving network node. In one embodiment, the TCP module or a component thereof may monitor to determine whether any TCP segment received from the receiving node over the TCP connection includes a header in which the RST control flag is set. In normal TCP operation, a receiving node would send back an RST segment when the receiving node receives a TCP segment that cannot be associated with any TCP connection maintained by the receiving node. This may happen after the receiving node restarts without first gracefully closing all of its existing TCP connections.

In this embodiment, the TCP module or the component thereof may also determine that a TCP connection to a receiving node is lost when no acknowledgements are received from the receiving node within a specified interval of time. For example, the TCP module or the component thereof may reset a timer every time an acknowledgement TCP segment is received over the TCP connection from the receiving node; if the timer expires (e.g. if no acknowledgments are received within the timer interval), this may be an indication that the receiving node is permanently down or that for whatever reason a TCP connection cannot be re-established thereto.

3.2 Responding to Transmission Delay Anomalies

Referring to FIG. 2, in step 206 the TCP module or a component thereof determines that a transmission delay anomaly exists on a particular TCP connection to a particular receiving node.

In response to determining that transmission delays are occurring on the TCP connection, in step 208 the TCP module or the component thereof may store in a persistent buffer the incoming segments that are received for transmission over the TCP connection. In some embodiments, the persistent buffer may be organized as a First-In-First-Out (FIFO) queue where incoming segments are stored at the tail of the FIFO queue.

According to the techniques described herein, the TCP module or the component thereof keep storing incoming segments in the persistent buffer instead of the transmit queue associated with the TCP connection at least until the transmission delay is cleared. In this way, the techniques described herein modify the normal operation of TCP to ensure that segments received for transmission over the TCP connection will not be lost if the transmission delay becomes severe enough to cause the transmit queue and/or any other buffers of the TCP connection to overflow.

The TCP module or a component thereof continue to monitor the TCP connection to determine whether the transmission delay has cleared. When the TCP module or the component thereof determine that the transmission delay is cleared, in step 210 the segments stored in the persistent buffer are transferred to the transmit queue of the TCP connection for transmission to the receiving node. In some embodiments, the TCP module or the component thereof may continue storing incoming segments into the persistent buffer until normal transmission over the TCP connection is fully resumed and the transmit queue has sufficient capacity to receive all incoming segments. In embodiments in which the persistent buffer is implemented as a FIFO queue, the segments are transferred to the transmit queue in order starting from the head of the FIFO queue.

In step 212, the TCP module transmits the segments in the transmit queue of the TCP connection to the receiving node. In some embodiments, this step may be continuously performed concurrently with or after the step in which incoming segments are stored in the persistent buffer.

3.3 Responding to Loss of Connection Anomalies

Referring to FIG. 2, in step 214 the TCP module or a component thereof determines that a particular TCP connection to a particular receiving node is closed abnormally or is lost. For example, the TCP module or the component thereof may determine that a RST segment has been received over the TCP connection from the particular receiving node or that no acknowledgement segments have been received during a specified time interval.

When the TCP module or the component thereof determine that the TCP connection to the receiving node is closed abnormally or is lost and before the queues and buffers associated with the TCP connection are flushed, in step 216A the TCP module or the component thereof may copy, or cause copying of, the segments in the transmit queue of the TCP connection into the persistent buffer associated therewith. In embodiments in which the persistent buffer is implemented as a FIFO queue, any segments in the transmit queue are copied at the head of the FIFO queue. In this way, the techniques described herein modify the normal operation of TCP to ensure that segments which have been placed in the transmit queue but which have not yet been transmitted over the TCP connection are preserved across the abnormal close or loss of the TCP connection and will be subsequently transmitted to the receiving node.

Concurrently with, or before, or after step 216A, in step 216B the TCP module or the component thereof may copy, or cause copying of, the segments in the retransmit queue of the TCP connection into the persistent buffer. In embodiments in which the persistent buffer is implemented as a FIFO queue, any segments in the retransmit queue are copied at the head of the FIFO queue so that they will be the first segments that will be subsequently transferred to the receiving node over a new TCP connection established thereto. In this way, the techniques described herein modify the normal operation of TCP to ensure that segments which have been transmitted over the TCP connection, but which have not yet been acknowledged by the receiving node, are preserved across the abnormal close or loss of the TCP connection and will be subsequently re-transmitted to the receiving node over a new TCP connection.

In one embodiment, the techniques for enhancing transmission reliability described herein provide a new TCP socket option that may be set for TCP connections established and maintained by a TCP module. In this embodiment, the techniques described herein also provide a function call which, when invoked, is operable to set the new TCP socket option for a TCP connection identified in the call. When the function call is invoked to set the new TCP socket option for a TCP connection, any segments still stored in the transmit and/or retransmit queues of the TCP connection are copied to a persistent buffer that may also be identified in the call. In some embodiments, invoking the function call to set the new TCP socket option for a TCP connection may also cause segments in any other queues or buffers associated therewith (e.g. any receive queues of the TCP connection) to be also stored in one or more persistent buffers. Thus, in this embodiment a TCP module or a component thereof may perform steps 216A and 216B by invoking the function call to set the new TCP socket option on a TCP connection which has just been lost—in this way, this embodiment would ensure that segments still lingering in the transmit and/or retransmit queues of a lost TCP connection would not be flushed but preserved for subsequent re-transmission.

Concurrently with, or before, or after steps 216A and 216B, in step 216C the TCP module or the component thereof may store all incoming segments in the persistent buffer. In embodiments in which the persistent buffer is implemented as a FIFO queue, any incoming segments that are received for transmission to the receiving node are stored at the tail of the FIFO queue so that they will be transmitted to the receiving node over a new TCP connection after any segments that were previously stored in the transmit and/or retransmit queues of the lost TCP connection. In this way, the techniques described herein modify the normal operation of TCP to ensure that no incoming segments are going to be lost during the interval of time in which the old TCP connection is already lost and the new TCP connection is not yet established.

In step 218, the TCP module establishes a new TCP connection to the receiving node, and allocates thereto a new transmit queue and a new retransmit queue. In one embodiment, when the TCP module or a component thereof determines that the receiving node is down, the TCP module may establish a new TCP connection to a new receiving node that may have been specified as a backup in case the receiving node is down. Subsequently, the TCP module would transmit the segments stored in the persistent buffer, and any new incoming segments, over the new TCP connection to the new receiving node. In one embodiment, no new receiving node may be available as a backup. In this embodiment, since the capacity of the storage in which the persistent buffer is established may be limited (for example, because RAM capacity or disk storage capacity may be limited), the sending node which operates the TCP module may save some segment data and may drop other segment data in order to make space. For example, the sending node may save the TCP/IP header information of the segments stored in the persistent buffer and may drop the payload data of the segments.

Subsequent to step 218, in step 220 segments stored in the persistent buffer are transferred into the new transmit queue of the new TCP connection for transmission to the receiving node. In embodiments in which the persistent buffer is implemented as a FIFO queue, the transfer of segments into the new transmit queue begins at the head of the FIFO queue in order to reduce the need for segment reordering at the receiving node. In some embodiments, the TCP module or the component thereof may continue to store incoming segments in the persistent buffer during step 220 until it is determined that the new transmit queue has sufficient capacity to resume normal TCP operation; thereafter, the TCP module or the component thereof may place the incoming segments directly in the new transmit queue for transmission to the receiving node.

Concurrently with, or after step 220, in step 222 the TCP module continuously transmits the segments from the new transmit queue over the new TCP connection to the receiving node.

3.4 Additional Features and Alternative Embodiments

In one embodiment, a TCP module in a network node may commence storing incoming segments into a persistent buffer even before a TCP connection to a receiving node is established. For example, in some operational scenarios a TCP module may start receiving data from an application before or during the handshake phase of establishing a TCP connection to the receiving node to which the data needs to be transmitted. According the techniques described herein, in these operational scenarios the TCP module may store incoming segments containing application data into the persistent buffer at least until the TCP connection to the receiving node is established. When the TCP connection is set up, the TCP module may transfer the segments from the persistent buffer to the transmit queue associated with the TCP connection. The TCP module may continue to store incoming segments in the persistent buffer until the transmit queue of the TCP connection has sufficient capacity to resume normal TCP operation; thereafter, the TCP module may place the incoming segments directly in the transmit queue for transmission to the receiving node.

In one embodiment, a TCP module in a network node may use TCP multiplexing. For example, the network node may use the same TCP buffers and queues to send segments over multiple TCP connections established to multiple TCP ports on the same receiving node. In this embodiment, according to the techniques described herein the TCP module would allocate a separate persistent buffer for each multiplexed TCP segment stream (from the network node to a separate TCP port on the receiving node) even though the multiplexed segment streams may share the same transmit and retransmit queues. Thus, in this embodiment the allocation of a persistent buffer is strictly on a per-connection basis. Further, in this embodiment the detection of transmission anomalies on any of the multiplexed TCP connections and responding to any detected transmission anomalies is also performed on a per-connection basis in the same manner as described heretofore.

The techniques for enhancing transmission reliability described herein are not limited to any particular operational context or to any particular connection-oriented transport protocol. Various features other than the described herein may be included, and various other modifications may be made, to the various embodiments of the techniques described herein. Thus, the embodiments described in the present disclosure are to be regarded in an illustrative rather than a restrictive sense.

4.0 An Example Operational Context

The techniques for enhancing transmission reliability of monitored data described herein may be implemented in an operational context that requires monitoring of network traffic between clients and servers involved in electronic trading or real-time financial transactions. One challenge in this operational context is to provide efficient monitoring in which the monitoring functionality itself does not introduce any extra effects on throughput and performance while still providing accurate information about the monitored network traffic. Another challenge in this operational context is to provide accurate information about both the network-level and the application-level aspects of the same transaction in which a client and a server exchanging the network traffic are involved, because each of these levels may introduce its own idiosyncratic effects and may require different tuning options to extract maximum throughput and performance.

One solution that addresses both challenges of this operational context involves out-of-band monitoring of the exchanged network traffic where the out-of-band monitoring is performed at a network infrastructure element through which the network traffic is routed or forwarded. As used herein, "network infrastructure element" refers to a networking device that is operable to receive traffic flows from one or more networks and to route or forward the received traffic flows in the same or different one or more networks. Examples of network infrastructure elements include, but are not limited to, routers, switches, bridges, and hubs. A network infrastructure element may perform out-of-band monitoring of network traffic by copying packets from the network traffic that passes through, and thereafter sending the copied packets for analysis to a separate network node that is located outside of the path on which the network traffic is transmitted through the network.

In one embodiment, the above solution may be implemented by providing a promiscuous mode (or p-mode) adapter that is operatively coupled to a node, where the node may be coupled as a blade into, or may be otherwise communicatively connected to, a network infrastructure element. In this embodiment, as network packets of a network flow pass through the network infrastructure element, the network infrastructure element makes copies of the packets and passes the copies to the node. The node or a component thereof examines the packet copies to determine whether the packets are of interest, and if so extracts any TCP segments that are contained therein. The network node or the component thereof passes the extracted TCP segments to the p-mode adapter. The p-mode adapter may examine the received TCP segments, re-arrange them if necessary, compute any metrics associated therewith, and may generate framed messages that include the received TCP segments and/or any computed metrics. Thereafter, the p-mode adapter sends the framed messages to a TCP module running on the node for transmission over a TCP connection to a transaction monitoring server that is executing on a remote network node. The transaction monitoring server is operable to process the received framed messages in order to provide detailed analysis of the network flow and to detect any anomalies that may exist therein.

Thus, in this embodiment there are effectively two threads running on the node that is coupled to the network infrastructure element: a receiver thread that receives packet copies representing monitored data from the network infrastructure element and a sender thread associated with the p-mode adapter that sends the framed messages with the monitored data to the transaction monitoring server for analysis. One issue with this embodiment is that the sender thread in the node may stall the receiver thread and may cause loss of monitored data if the transaction monitoring server is not processing and/or analyzing the framed messages at least at the rate at which the receiver thread is receiving packet copies. For example, if the TCP connection between the sender thread and the transaction monitoring server experiences transmission delays or goes down abnormally, the framed messages generated by the p-mode adapter for the sender thread would start getting queued up and may eventually be lost when the sender and/or receiver thread buffers overflow. However, the transaction monitoring server would need all framed messages from the sender thread in order to be able to perform correct analysis.

Figure 3:
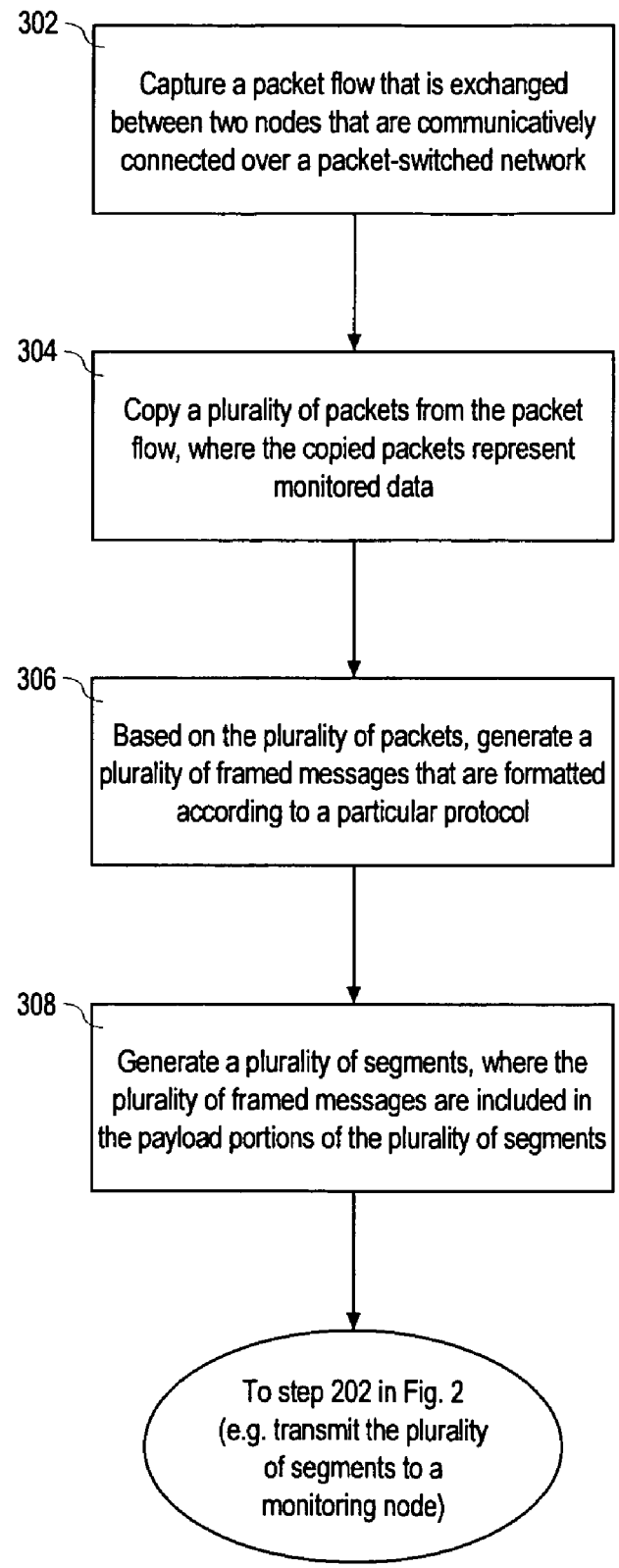
FIG. 3 illustrates an example method for enhancing transmission reliability of monitored data in an example operational context.

The techniques for enhancing transmission reliability of monitored data described herein address this issue with the above embodiment. FIG. 3 illustrates an example method for enhancing transmission reliability of monitored data in this operational context.

In step 302, a packet flow is captured at a network infrastructure element. The packet flow may be exchanged through the network infrastructure element between two or more network nodes (for example, nodes running clients and servers) that are communicatively connected to a packet-switched network.

In step 304, a plurality of packets in the captured packet flow are copied, where the copied packets include monitored data that is deemed of interest. Based on the packet copies, in step 306 a plurality of framed messages are generated by the network infrastructure element or by a component thereof. In some embodiments, the framed messages may be formatted according to a particular protocol that is suited for reporting monitored data. Examples of such protocol include, but are not limited to, the Financial Information eXchange (FIX) protocol and the HyperText Transfer Protocol (HTTP).

In step 308, the generated framed messages are included in the payload portions of a plurality of TCP segments that are to be sent to a remote network node for analysis by a transaction monitoring server executing thereon. The TCP segments carrying the framed messages are transferred to a TCP module for transmission over a TCP connection to the remote network node, where the TCP module is configured to perform steps 202-222 illustrated in FIG. 2. For example, as described heretofore with respect to step 204 in FIG. 2, the TCP module or a component thereof may be operable to detect any transmission anomalies on the TCP connection to the transaction monitoring server executing on the remote network node. When transmission delay is detected, the TCP module or a component thereof may perform steps 206-212 as described heretofore with respect to FIG. 2 in order to ensure that all framed messages would be reliably delivered to the transaction monitoring server. When the TCP module or a component thereof detects an abnormal close or loss of the TCP connection to the remote network node, the TCP module or the component thereof may perform steps 214-222 as described heretofore with respect to FIG. 2 in order to ensure that all framed messages would be reliably delivered to the transaction monitoring server.

Figure 4:
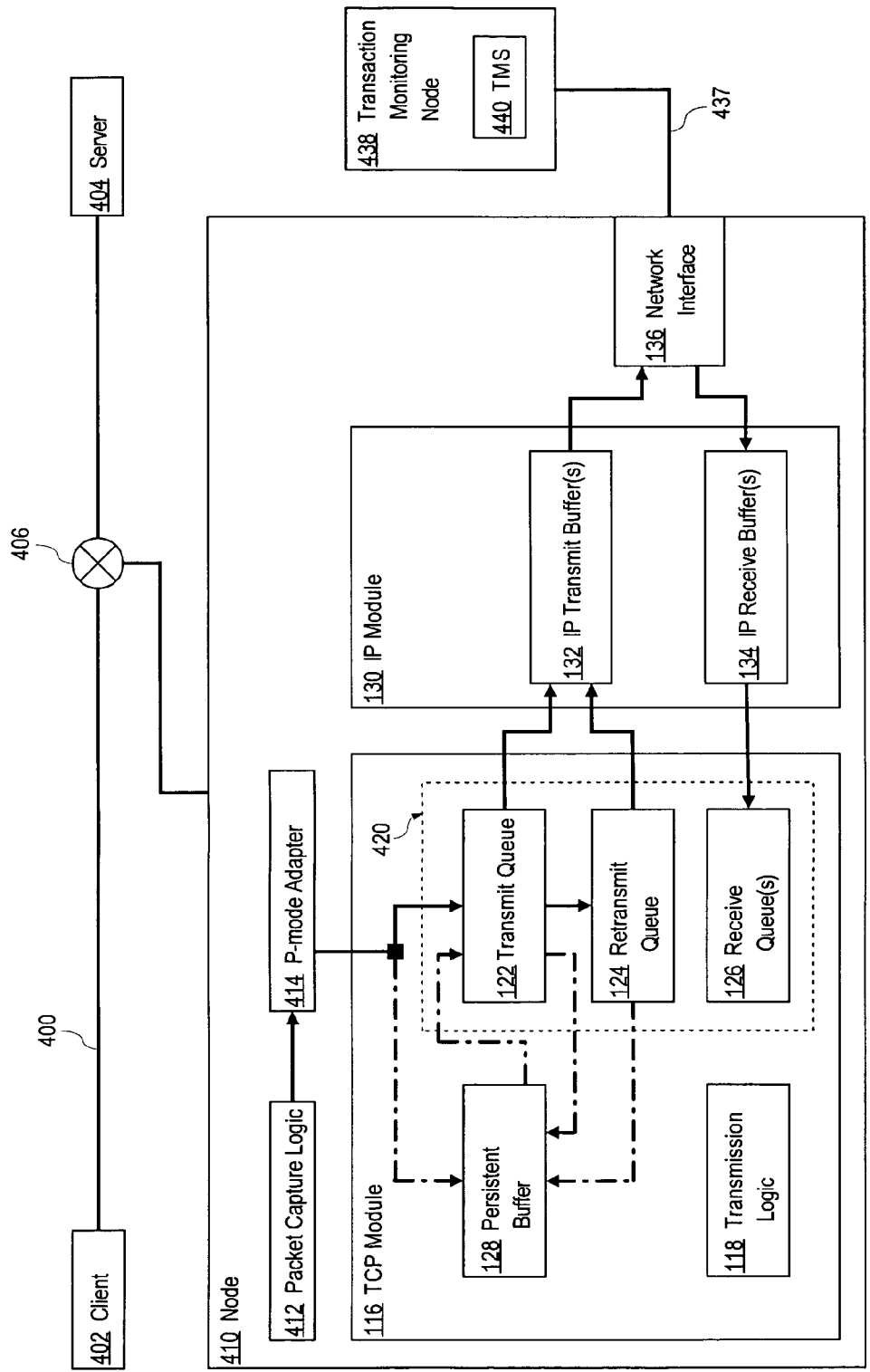
FIG. 4 illustrates an example operational context.

FIG. 4 illustrates an example operational context in which an embodiment of the method of FIG. 3 may be implemented.

Referring to FIG. 4, client 402 is communicatively connected to server 404 over one or more networks 400. Server 404 is executing real-time financial transactions initiated by client 402. The packet flow exchanged between client 402 and server 404 is routed through network infrastructure element 406. Network infrastructure element 406 and node 410 coupled thereto are operable to perform out-of-band monitoring of the packet flow exchanged between client 402 and server 404, and to send the monitored data captured therefrom to transaction monitoring server (TMS) 440 that is executing on transaction monitoring node 438.

Node 410 is connected to network infrastructure element 406 as a blade that is operatively coupled to the backplane of the network infrastructure element. Node 410 comprises TCP module 116, IP module 130, one or more network interfaces such as network interface 136, packet capture logic 412, and p-mode adapter 414. TCP module 116, IP module 130, and network interface 136 are operable to perform the same functionalities as the corresponding elements referenced by the identical reference numerals in FIG. 1.

Packet capture logic 412 may be implemented as one or more software components that are executable by one or more processors, as one or more hardware components such as ASICs, or as any combination of one or more software and hardware components. When executed, packet capture logic 412 is operable to use a Berkeley Packet Filter (BPF) to filter packets that are received at node 410. For example, packet capture logic 412 may be operable to capture packets that are sent to or from specified network addresses. In another example, packet capture logic 412 may be operable to capture packets that include as payload TCP segments that are sent on a specific TCP port. Packet capture logic 412 may also be operable to inspect the incoming packets (or copies thereof) and to perform any necessary IP checksums, re-assembly, and TCP segment reordering.

P-mode adapter 414 may be implemented as one or more software components that are executable by one or more processors, as one or more hardware components such as ASICs, or as any combination of one or more software and hardware components. When executed, p-mode adapter 414 is operable receive monitored data from packet capture logic 412 and to generate framed messages therefrom. P-mode adapter 414 may format the framed messages according to a protocol that is understood by TMS 440, for example FIX or HTTP. P-mode adapter 414 is operable to transfer the framed messages to TCP module 116, where the framed messages are encapsulated in TCP segments for transmission over network 437 to network monitoring node 438. (Network 437 may be the same or different network than the one or more networks 400).

Network monitoring node 438 is operable to execute TMS 440. When executed, based on framed messages received from node 410 TMS 440 is operable to monitor and analyze transaction-related latencies of transactions initiated by client 402 on server 404. Such transactions may be executed at the application layer relative to the communication stack established between client 402 and server 404 or at any layer above the TCP layer. Based on the framed messaged received from node 410, TMS 440 is also operable to monitor and analyze transmission-related latencies of the traffic exchanged between client 402 and server 404, where the traffic is exchanged at the network and/or transport layers of the communication stack. The framed messages sent by node 410 may include information representing time-sensitive financial transactions, and TMS 440 may be configured to monitor how well server 404 is performing and whether there are any delays caused somewhere between client 402 and server 404 at the application and/or transport layer levels.

In the embodiment illustrated in FIG. 4, TCP module 116 may be implemented in the OS executing on node 410, which user space is accessible by p-mode adapter 414 and/or packet capture logic 412. In other embodiments, TCP module 116 may be executing within the kernel space of the OS. TCP module 116 is operable to perform the techniques for enhancing transmission reliability of monitored data as described heretofore with respect to FIG. 1.

For example, suppose that client 402 initiates one or more real-time financial transactions on server 404. The traffic flow carrying information about these transactions is routed through network infrastructure element 406. Network infrastructure element 406 and/or node 410 are operable to monitor the traffic flow out-of-band by filtering out and capturing only those packets from the traffic flow that are deemed of interest. For example, packet capture logic 412 may be configured to copy only those packets from the traffic flow exchanged between client 402 and server 404 which packets include TCP segments sent to the default FIX protocol TCP port (port 9000).

After extracting, checking, and reordering (if necessary) the TCP segments contained the captured packets, packet capture logic 412 transfers the extracted TCP segments to p-mode adapter 414. Based on the extracted TCP segments, p-mode adapter 414 generates one or more framed messages formatted according to the FIX protocol. P-mode adapter 414 then transfers the frames messages to TCP module 116 for transmission to TMS 440.

TCP module 116 encapsulates the framed messages received from p-mode adapter 414 into a plurality of segments for transmission over TCP connection 420 to transaction monitoring node 438. TCP module 116 provides enhanced transmission reliability for the plurality of segments according to the techniques described herein.

For example, at some point in time transmission logic 118 may detect a transmission anomaly on TCP connection 420, which is associated with transmit queue 122, retransmit queue 124, and one or more receive queues 126. When the detected transmission anomaly is a transmission delay, transmission logic 118 stores or causes incoming segments to be stored into persistent buffer 128 instead of being placed in transmit queue 122. Incoming segments containing framed message data from p-mode adapter 114 are continuously stored in persistent buffer 128 at least until transmission logic 118 determines that the transmission anomaly on TCP connection 420 has cleared. When the transmission anomaly is cleared, transmission logic 118 transfers or causes the transfer of segments from persistent buffer 128 into transmit queue 122 until the persistent buffer is empty. When persistent buffer 128 empties, transmission logic 118 stops storing incoming segments therein, and TCP module 116 resumes normal operation by placing the incoming segments directly into transmit queue 122.

When transmission logic 118 determines that TCP connection 420 is abnormally closed or lost, and before the queues, buffers, and other data structures associated with TCP connection 420 are discarded, transmission logic 118 causes the copying into persistent buffer 128 of all segments that are still stored in transmit queue 122 and retransmit queue 124. Any incoming segments with framed message data from p-mode adapter 414 are also stored in persistent buffer 128. Thereafter, TCP module 116 would establish a new TCP connection to network node 438 in order to communicate with TMS 440 executing thereon. When the new TCP connection is established, transmission logic 118 transfers or causes the transfer of segments from persistent buffer 128 into the new transmit queue associated with the new TCP connection. When persistent buffer 128 empties, transmission logic 118 stops storing incoming segments in persistent buffer 128, and TCP module 116 resumes normal operation by placing the incoming segments directly into the new transmit queue of the new TCP connection for transmission to network node 438.

5.0 Implementation Mechanisms—Hardware Overview

Figure 5:
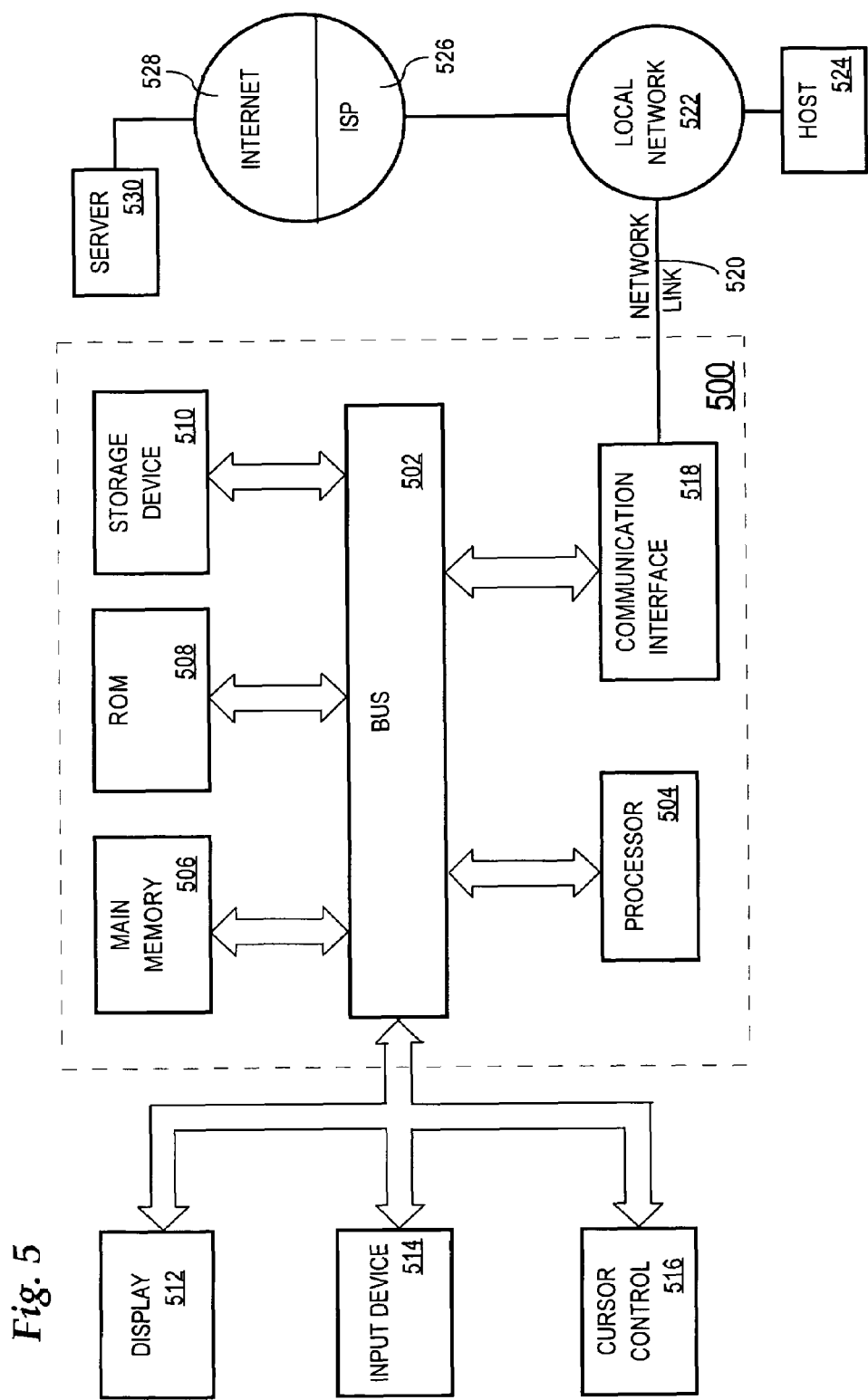
FIG. 5 illustrates a computer system.

FIG. 5 illustrates a computer system 500 upon which embodiments of the techniques for enhancing transmission reliability of monitored data may be implemented. For example, one embodiment may be implemented using one or more computer programs running on a computer system 500 that is operatively coupled as a blade to the backplane of a network infrastructure element such as, for example, a router or a switch.

Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In one embodiment, computer system 500 is used for enhancing transmission reliability of monitored data. According to this embodiment, enhancement of transmission reliability is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry or other hardware-based logic may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for enhancing transmission reliability of monitored data as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   one or more processors; and
   logic encoded in one or more volatile or non-volatile storage media for execution and when executed operable to:
      receive a plurality of segments for transmission over a Transmission Control Protocol (TCP) connection to a network node, wherein the TCP connection when established is associated with a transmit queue and a retransmit queue;
      detect a transmission anomaly on the TCP connection to the network node; and
      in response to detecting the transmission anomaly, perform any one of:
         prior to transferring first one or more segments of the plurality of segments into the transmit queue, store the first one or more segments into a persistent buffer;
         copy second one or more segments of the plurality of segments from the retransmit queue into the persistent buffer, wherein the second one or more segments have been transmitted to, but have not yet been acknowledged by, the network node; and
         copy third one or more segments of the plurality of segments from the transmit queue into the persistent buffer, wherein the third one or more segments have not yet been transmitted to the network node.

2. The apparatus of claim 1, further comprising logic which, when executed, is operable to:
   determine that the transmission anomaly on the TCP connection has ceased to exist; and
   transfer the first one or more segments from the persistent buffer into the transmit queue for transmission to the network node.

3. The apparatus of claim 1, wherein the logic that is operable to detect the transmission anomaly further comprises logic which, when executed, is operable to determine that one or more metrics exceed certain thresholds that indicate transmission delays over the TCP connection to the network node.

4. The apparatus of claim 3, wherein the one or more metrics include any one of:
   average request-response times over the TCP connection;
   round-trip latency over the TCP connection;
   number of retransmissions over the TCP connection; and
   number of not acknowledged segments transmitted over the TCP connection.

5. The apparatus of claim 1, wherein the logic that is operable to detect the transmission anomaly further comprises logic which, when executed, is operable to determine that a TCP segment received from the network node includes a header in which a window size field is set to zero.

6. The apparatus of claim 1, wherein:
   the logic that is operable to detect the transmission anomaly further comprises logic which, when executed, is operable to determine that a TCP segment received from the network node includes a header in which a RST control flag is set; and
   the apparatus further comprises logic which, when executed, is operable to:
      in response to determining that the RST control flag in the header of the received TCP segment is set, establish a new TCP connection to the network node, wherein the new TCP connection is associated with a new transmit queue and a new retransmit queue; and
      transfer the second one or more segments and the third one or more segments from the persistent buffer into the new transmit queue.

7. The apparatus of claim 1, wherein the logic that is operable to copy the second one or more segments and the third one or more segments into the persistent buffer further comprises logic which, when executed, is operable to invoke a TCP socket option call for the TCP connection, wherein the TCP socket option call causes the second one or more segments and the third one or more segments to be copied into the persistent buffer.

8. The apparatus of claim 1, further comprising one or more non-volatile storage media that are operable to store the persistent buffer.

9. The apparatus of claim 1, further comprising:
   a first network interface that is operable to communicatively connect to a packet-switched network;
   a second network interface that is operable to transmit the plurality of segments to the network node, wherein the network node is operable to process monitored data; and
   logic which when executed is operable to:
      at the first network interface, capture a packet flow that is exchanged between two nodes that are communicatively connected over the packet-switched network;
      copy a plurality of packets from the packet flow, wherein the plurality of packets represent the monitored data;
      based on the plurality of packets, generate a plurality of framed messages that are formatted according to a particular protocol; and
      generate the plurality of segments, wherein the plurality of framed messages are included in the payload portions of the plurality of segments.

10. The apparatus of claim 9, wherein the logic that is operable to capture the packet flow further comprises logic which, when executed, is operable to determine the plurality of packets by filtering the packet flow according to one or more criteria.

11. An apparatus comprising:
    means for receiving a plurality of segments for transmission over a Transmission Control Protocol (TCP) connection to a network node, wherein the TCP connection when established is associated with a transmit queue and a retransmit queue;
    means for detecting a transmission anomaly on the TCP connection to the network node; and any one of:
       means for storing first one or more segments of the plurality of segments into a persistent buffer when the transmission anomaly is detected, wherein the first one or more segments are stored in the persistent buffer prior to being transferred into the transmit queue;

means for copying second one or more segments of the plurality of segments from the retransmit queue into the persistent buffer when the transmission anomaly is detected, wherein the second one or more segments are copied into the persistent buffer after being transmitted to, but before being acknowledged by, the network node; and means for copying third one or more segments of the plurality of segments from the transmit queue into the persistent buffer when the transmission anomaly is detected, wherein the third one or more segments are copied into the persistent buffer prior to being transmitted to the network node.

12. The apparatus of claim 11, further comprising:
means for determining that the transmission anomaly on the TCP connection has ceased to exist; and
means for transferring the first one or more segments from the persistent buffer into the transmit queue for transmission to the network node.

13. The apparatus of claim 11, wherein the means for detecting the transmission anomaly further comprise means for determining that one or more metrics exceed certain thresholds that indicate transmission delays over the TCP connection to the network node.

14. The apparatus of claim 13, wherein the one or more metrics include any one of:
average request-response times over the TCP connection;
round-trip latency over the TCP connection;
number of retransmissions over the TCP connection; and
number of not acknowledged segments transmitted over the TCP connection.

15. The apparatus of claim 11, wherein the means for detecting the transmission anomaly further comprise means for determining that a TCP segment received from the network node includes a header in which a window size field is set to zero.

16. The apparatus of claim 11, wherein:
the means for detecting the transmission anomaly further comprise means for determining that a TCP segment received from the network node includes a header in which a RST control flag is set; and
the apparatus further comprises:
means for establishing a new TCP connection to the network node in response to determining that the RST control flag in the header of the received TCP segment is set, wherein the new TCP connection is associated with a new transmit queue and a new retransmit queue; and
means for transferring the second one or more segments and the third one or more segments from the persistent buffer into the new transmit queue.

17. The apparatus of claim 11, wherein the means for copying the second one or more segments and the third one or more segments into the persistent buffer further comprise means for invoking a TCP socket option call for the TCP connection, wherein the TCP socket option call causes the second one or more segments and the third one or more segments to be copied into the persistent buffer.

18. The apparatus of claim 11, further comprising one or more non-volatile storage media that are operable to store the persistent buffer.

19. The apparatus of claim 11, further comprising:
a first network interface that is operable to communicatively connect to a packet-switched network;
a second network interface that is operable to transmit the plurality of segments to the network node, wherein the network node is operable to process monitored data;
means for capturing, at the first network interface, a packet flow that is exchanged between two nodes that are communicatively connected over the packet-switched network;
means for copying a plurality of packets from the packet flow, wherein the plurality of packets represent the monitored data;
means for generating, based on the plurality of packets, a plurality of framed messages that are formatted according to a particular protocol; and
means for generating the plurality of segments, wherein the plurality of framed messages are included in the payload portions of the plurality of segments.

20. The apparatus of claim 19, wherein the means for capturing the packet flow further comprise means for determining the plurality of packets by filtering the packet flow according to one or more criteria.

21. Logic encoded in one or more volatile or non-volatile storage media for execution and when executed operable to:
receive a plurality of segments for transmission over a Transmission Control Protocol (TCP) connection to a network node, wherein the TCP connection when established is associated with a transmit queue and a retransmit queue;
detect a transmission anomaly on the TCP connection to the network node; and
in response to detecting the transmission anomaly, perform any one of:
prior to transferring first one or more segments of the plurality of segments into the transmit queue, store the first one or more segments into a persistent buffer;
copy second one or more segments of the plurality of segments from the retransmit queue into the persistent buffer, wherein the second one or more segments have been transmitted to, but have not yet been acknowledged by, the network node; and
copy third one or more segments of the plurality of segments from the transmit queue into the persistent buffer, wherein the third one or more segments have not yet been transmitted to the network node.

22. A system comprising:
a monitoring node operable to process monitored data; and
an apparatus comprising:
a first network interface that is operable to communicatively connect to a packet-switched network;
a second network interface that is operable to communicatively connect to the monitoring node; and
logic encoded in one or more volatile or non-volatile storage media for execution and when executed operable to:
at the first network interface, capture a packet flow that is exchanged between two nodes that are communicatively connected over the packet-switched network;
copy a plurality of packets from the packet flow, wherein the plurality of packets represent the monitored data;
based on the plurality of packets, generate a plurality of framed messages that are formatted according to a particular protocol;
generate a plurality of segments, wherein the plurality of framed messages are included in the payload portions of the plurality of segments, wherein the plurality of segments are to be sent over a Transmission Control Protocol (TCP) connection to the monitoring node, wherein the TCP connection is associated with a transmit queue and a retransmit queue;

detect a transmission anomaly on the TCP connection to the monitoring node; and in response to detecting the transmission anomaly, perform any one of:

prior to transferring first one or more segments of the plurality of segments into the transmit queue, store the first one or more segments into a persistent buffer;

copy second one or more segments of the plurality of segments from the retransmit queue into the persistent buffer, wherein the second one or more segments have been transmitted to, but have not yet been acknowledged by, the monitoring node; and copy third one or more segments of the plurality of segments from the transmit queue into the persistent buffer, wherein the third one or more segments have not yet been transmitted to the monitoring node.

* * * * *